United States Patent
Hobson (10) Patent No.: US 9,619,015 B2
(45) Date of Patent: Apr. 11, 2017

(54) IMPLEMENTING A POWER OFF STATE IN A COMPUTING DEVICE

(75) Inventor: Louis B. Hobson, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 217 days.

(21) Appl. No.: 14/375,831

(22) PCT Filed: Jul. 27, 2012

(86) PCT No.: PCT/US2012/048686
§ 371 (c)(1),
(2), (4) Date: Jul. 31, 2014

(87) PCT Pub. No.: WO2014/018064
PCT Pub. Date: Jan. 30, 2014

(65) Prior Publication Data
US 2015/0323983 A1   Nov. 12, 2015

(51) Int. Cl.
G06F 1/32    (2006.01)
G06F 9/44    (2006.01)

(52) U.S. Cl.
CPC .......... G06F 1/3296 (2013.01); G06F 1/3203 (2013.01); G06F 1/3234 (2013.01); G06F 1/3275 (2013.01); G06F 9/442 (2013.01); G06F 9/4418 (2013.01); Y02B 60/32 (2013.01)

(58) Field of Classification Search
CPC .... G06F 1/3296; G06F 1/3203; G06F 1/3234; G06F 1/3275; G06F 9/4418; G06F 9/442; G06F 1/32; Y02B 60/32
USPC .......................................... 713/323
See application file for complete search history.

(56) References Cited

U.S. PATENT DOCUMENTS

| | | | |
|---|---|---|---|
| 6,453,423 B1* | 9/2002 | Loison | G06F 1/26 |
| | | | 713/310 |
| 6,523,128 B1 | 2/2003 | Stapleton et al. | |
| 7,058,831 B2 | 6/2006 | Check et al. | |
| 7,529,923 B2 | 5/2009 | Chartrand et al. | |
| 7,689,850 B2 | 3/2010 | Cantwell et al. | |

(Continued)

FOREIGN PATENT DOCUMENTS

CN   102160016    8/2011
EP   1229430 A1   8/2002

(Continued)

OTHER PUBLICATIONS

Fred Langa, "Langa Letter: to Sleep, Perchance to Hibernate," InformationWeek, Sep. 27, 2002, pp. 1-4, UBM Electronics, Available at: <informationweek.com/news/6503205>.

(Continued)

*Primary Examiner* — Thomas Lee
*Assistant Examiner* — Aaron J Browne
(74) *Attorney, Agent, or Firm* — HP Inc. Patent Department (57) ABSTRACT

Example embodiments disclosed herein relate to implementing a power down state in a computing device. A sleep command is issued to place a computing device in a sleep state in response to receipt of a power off command at the computing device. Content of memory of the computing device is written to non-volatile storage of the computing device and the computing device is placed in a power off state.

19 Claims, 5 Drawing Sheets

(56) References Cited

U.S. PATENT DOCUMENTS

| | | | |
|---|---|---|---|
| 8,560,873 B1* | 10/2013 | Sosa | G06F 1/3203 713/323 |
| 2004/0073818 A1* | 4/2004 | Cheok | G06F 9/4418 713/300 |
| 2009/0055665 A1 | 2/2009 | Maglione et al. | |
| 2011/0131427 A1 | 6/2011 | Jorgenson et al. | |
| 2011/0185208 A1* | 7/2011 | Iwamoto | G06F 1/3203 713/323 |
| 2012/0042206 A1* | 2/2012 | Di Domenico | G06F 11/1441 714/15 |
| 2012/0102347 A1 | 4/2012 | Hobson | |
| 2013/0290757 A1* | 10/2013 | Barlow | G06F 1/3287 713/323 |
| 2014/0265631 A1* | 9/2014 | Lin | G01S 13/90 307/116 |

FOREIGN PATENT DOCUMENTS

| | | |
|---|---|---|
| EP | 0834796 B1 | 4/2004 |
| JP | 10-097353 | 4/1998 |
| JP | 2001-034371 | 2/2001 |
| JP | 2002-312079 | 10/2002 |

OTHER PUBLICATIONS

International Search Report and Written Opinion, International Application No. PCT/US2012/048686, Date of Mailing: Mar. 22, 2013, pp. 1-8.

"Advanced Configuration and Power Interface Specification Rev 2.0", Compaq/Intel/Microsoft/Phoenix/Toshiba, Jul. 27, 2000—230 pages.

Anonymous; "Fast Startup—Turn on or Off in Windows 8", May 20, 2012 :http://www.eightforums.com~8 pages.

* cited by examiner

IMPLEMENTING A POWER OFF STATE IN A COMPUTING DEVICE

BACKGROUND

Advances in technology have resulted in smaller and more powerful computing devices such a personal computer, laptop computer, mobile phone, and tablet computers. Battery life and power consumption have become important factors to consider as the computing devices get smaller in size and more powerful in computing capabilities, without sacrificing responsiveness of the computing device during wake up. Generally, the more components of the computing device that are not powered, the more power may be conserved and battery life of the computing device may be extended. The computing device can enter a sleep mode or a power off mode to reduce power consumption. For example, a user can instruct the computing device to enter a sleep, standby, or hibernation mode. Further, the user can select a shutdown command power and in response components of the computing device are powered off.

BRIEF DESCRIPTION OF THE DRAWINGS

The following detailed description references the drawings, wherein.

DETAILED DESCRIPTION

A computing device may conserve power and energy consumption by operating in one or more low-power modes (e.g., sleep states), as defined in the advanced configuration and power interface (ACPI) specification. The ACPI specification may include "S0-S5" power states. S0 represents a system's full-power state or an "on" state. Sleep states S1-S4 represent increasing levels of power savings and state S5 is the highest power-saving mode where the system is in a soft-off (i.e., shutdown) state. The S5 state may be achieved or triggered by a shut down command from a user, for example.

In an S4 state, contents of memory are stored into non-volatile memory prior to entering the S4 state to reduce latency during wake-up. However, the S4 sleep state consumes considerably more power than the S5 state. Moreover, some countries, for example European countries, have implemented regulations that impose a restriction on the amount of power the system can consume, such as 0.5 Watts while in the off state (e.g., in the S5 state).

Accordingly, as described in detail below, various examples relate to implementing a power off state in an operating system that issues a sleep state command (e.g., writes a sleep state indicator) in response to a power off command Prior to issuing the sleep state command or writing the sleep state indicator, the operating system writes a current state or contents of main memory to non-volatile storage. The controller may determine that a power off command triggered writing the sleep state indicator to a register and in response, the controller may write a power off state indicator to a second register. It should be noted that in some hardware instances, for example, the first and second registers are at the same address. In such an example, the register capability is reconfigured to allow the sleep state transition before the second write. Thus, contents of the main memory are stored before executing the power off command.

The controller is also operable to distinguish between a "shutdown S4" (i.e., S4 state command triggered by an S5 request) and a true "hibernation S4" (i.e., S4 state command triggered by an S4 request) issued by the operating system. Thus, in one example, the controller is operable to implement the S5 shutdown when the "shutdown S4" is invoked by the operating system. In another example, the system can implement the S4 sleep state when the true "hibernation S4" is invoked by the operating system. Accordingly, both a 0.5 W power consumption and low latency may be achieved by the computing device by writing the state of the computing device to the non-volatile storage device before powering off.

In the description that follows, reference is made to the term, "machine-readable storage medium." As used herein, the term "machine-readable storage medium" refers to any non-transitory electronic, magnetic, optical, or other physical storage device that stores executable instructions or other data (e.g., a hard disk drive, random access memory, flash memory, etc.).

Figure 1:
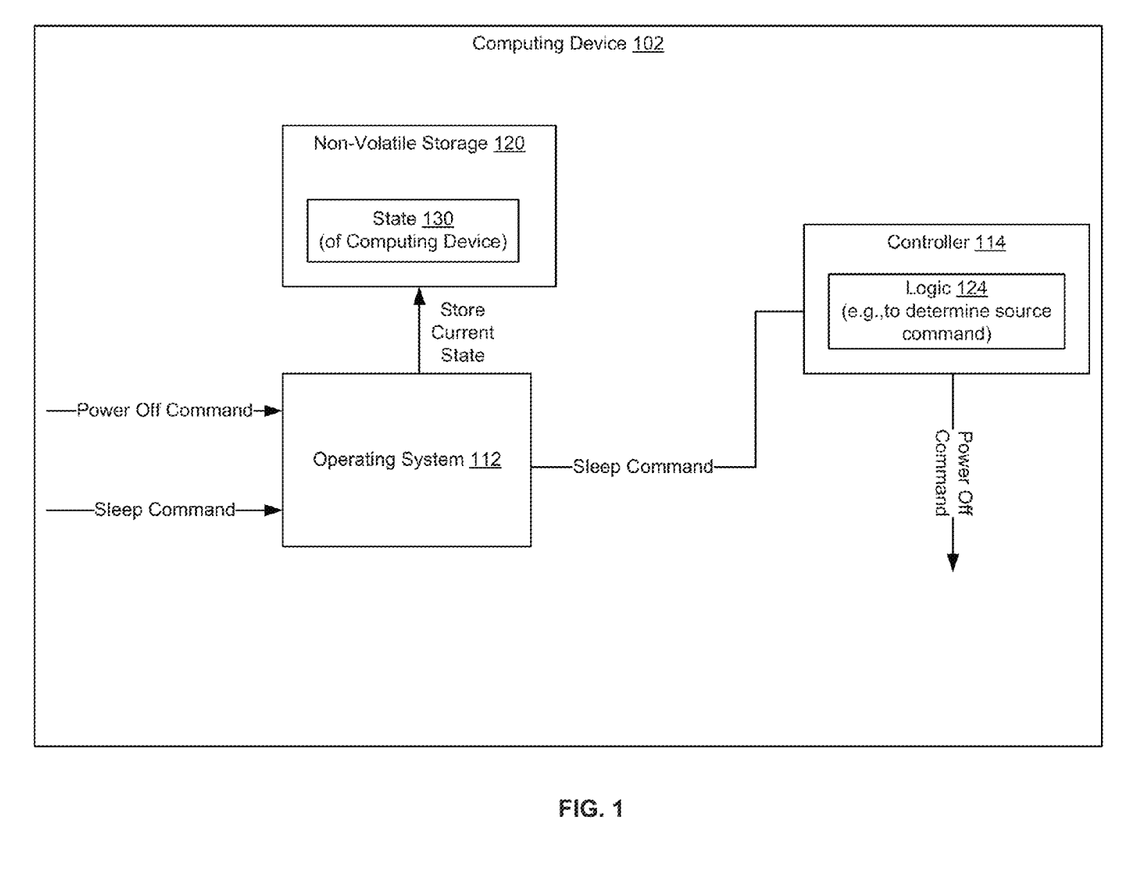
FIG. 1 is a block diagram of an example implementation of a computing device including a controller for implementing a power off state.

Referring now to the drawings, FIG. 1 is a block diagram of a computing device including a controller 114 for implementing a power off state, according to one example. Computing device 102 includes, for example, controller 114, non-volatile storage 120, and operating system 112 communicatively coupled as shown. Computing device 102 may be, for example, a notebook computer, a desktop computer, a laptop computer, a handheld computing device, a mobile phone, a server, a slate or tablet computing device, a portable reading device, or any other processing device.

Controller 114 may be, for example, performing auxiliary functions for the computing device 102, such as initialization, input/output (I/O), management, system reset functionality, thermal management operations, power management operations, and to configure and control various devices within the computing device 102. The controller 114 may be part of a system-on-chip (SoC) that may also include various additional components that may be coupled to the controller 114 (e.g., memory, keyboard, mouse, battery, etc). Further, the controller 114 may be a peripheral device controller for the computing device 102 (e.g., a keyboard controller). Moreover, controller 114 may include, or may be, a processor for executing instructions stored in a memory of the computing device 102, the instructions for controlling and managing components connected thereto.

Controller 114 includes logic 124 to identify a command received at the computing device 102 (i.e., source command) that triggered issuance of a sleep command by the operating system 112. To illustrate, logic 124 of controller 114 can determine if the command received at the computing device 102 is a power off command or a sleep command. For example, controller 114 can detect for a power off command received from a user accessing a power button of the computing device 102, from an application, or from an operating system of the computing device 102. In response to detecting the power off command, the controller 114 can issue a sleep command to the operating system 112. The sleep command can be an instruction for the operating system to transition to a S3 or S4 power state.

In response to receiving a power off command for the computing device 102, the controller 114 can instruct the operating system 112 to store the current state of the computing device to a non-volatile storage 120. Operating system 112 may be an ACPI-compliant operating system, where device configuration and power management is performed by the operating system 112. Operating system 112 may be stored on a memory of the computing device 102. In response to receiving the sleep command, the operating 112 system can write a current state 130 of the computing device to a non-volatile storage device 120.

The current state 130 of the computing device 102 can include content stored on random access memory of the computing device 102. The current state 130 may include operating system context and application content of main memory. The non-volatile storage 120 can include a hard drive or flash memory coupled to the computing device 102. Further, current state 130 may be stored as a file (e.g., a hibernation file) or image to be restored (or written back) to memory in response to the computing device 102 powering on from the power off state.

In one embodiment, the controller 114 can also set an indicator, such as a flag, for the computing device 102 to enter the sleep state. In response to the state 130 of the computing device 102 being written to the non-volatile storage device 120, the controller 114 issues a power off command to place the computing device in the power off state. The power off state can include a S5 power state of the computing device. In another embodiment, the power off state can include a mechanical off state of the computing device 102. If the computing device 102 is in the power off state, the computing device 102 can consume 0.5 W or less of power.

Figure 2:
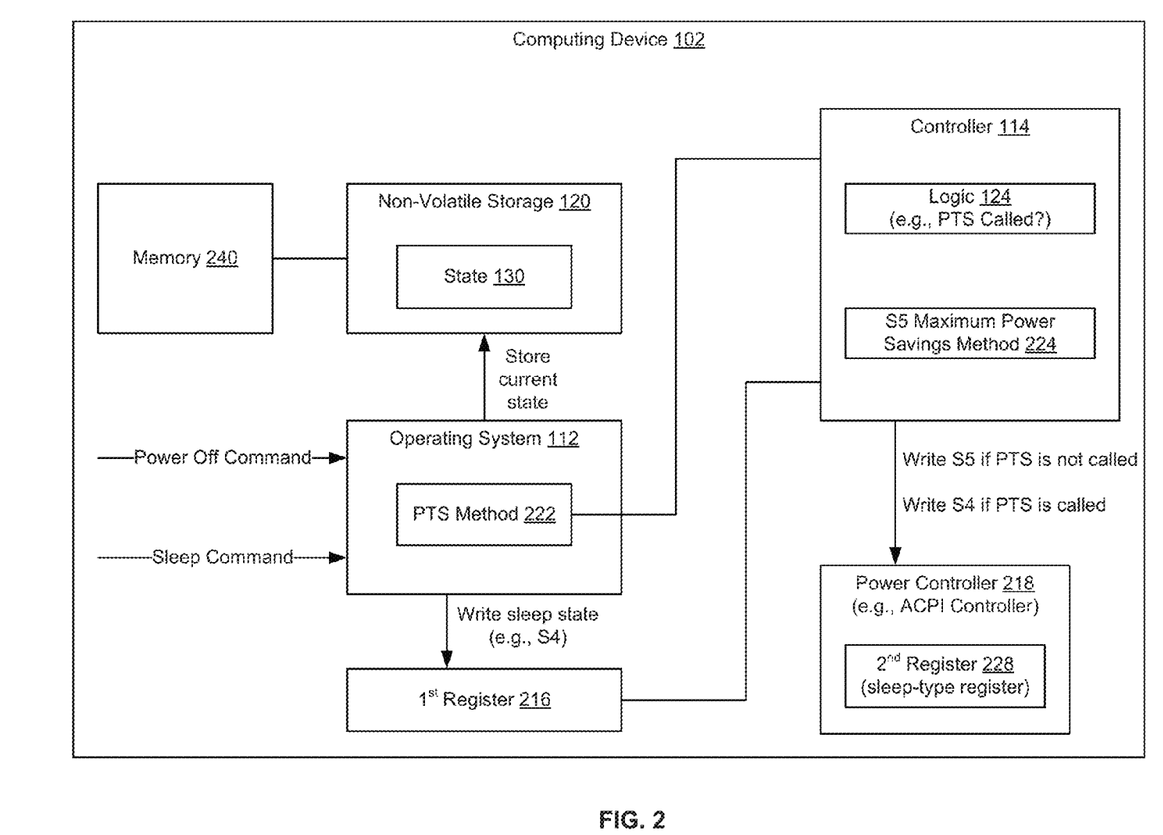
FIG. 2 is a block diagram of another example implementation of a computing device including a controller for implementing a power off state.

FIG. 2 is a block diagram of another example implementation of a computing device including a controller for implementing a power off state. In this example, the computing device 102 includes controller 114, power controller 218, non-volatile storage 120, operating system 112, a first register 216, and memory 240 communicatively coupled as shown.

As described above, the operating system 112 issues a sleep command in response to the computing device 102 receiving a power off command (i.e., S5 command) for the computing device 102 to power off. The operating system 112 also writes content of memory 240 to non-volatile storage 120, where the contents of memory 240 include operating system context and application content. In one example, the operating system 112 issues the sleep command by writing a sleep state (i.e., S4 state) indicator to the first register 216 in response to receiving the power off command The first register 216 may be a command register of the operating system where a sleep command is written. Further, the operating system 112 invokes a prepare-to-sleep (PTS) method 222 in response to receiving a sleep command at the computing device 112. Thus, controller 114, via logic 124, may reference or poll the PTS method 222 to determine if the power off command (not the sleep command) received at the computing device 102 triggered the sleep command by the operating system 112. For example, logic 124 of the controller 114 may set a flag when the PTS method 222 is invoked by the operating system 112. When the PTS method 222 is not called by the operating system 112, controller 114 issues the power off command, for example, by writing a power off state indicator (i.e., S5 state) to a second register 228 of power controller 218.

For example, when the computing device 102 is placed in the S5 state, the S5 maximum power savings method 224 (implemented by controller 114) turns off power to hardware such that less than 1 W (approximately 0.5 W) of power is consumed by the computing device 102. In one embodiment, during the S5 power state, wake events (e.g., wake-on-LAN) and management services of the computing device 102 are turned off.

In one embodiment, the computing device 102 can include a power controller 218, such as an ACPI controller, to implement the ACPI sleep-type. Power controller 218 includes second register 228 (i.e., a sleep-type register). Second register 228 is a register of the power controller 218 that indicates a power state to be executed or implemented by the power controller 218. For example, if the power off state indicator (e.g., S5 power state) is written to the second register 118, the power controller 118 places the computing device 102 in the S5 power state. In another embodiment, the sleep state indicator (e.g., S4 sleep state) is written to the second register 118, the power controller 118 places the computing device 102 in the S4 sleep state.

It should be noted that although FIG. 2 shows first register 116 (of the operating system 112) and second register 228 (of the power controller 218), an example embodiment may include a single register (e.g., ACPI sleep-type register) that stores the sleep state to be implemented by the power controller 118. In such an embodiment, when the operating system 112 issues an S4 sleep state indicator to the sleep-type register, in response to a power off command, the controller 114 intercepts writing of the sleep state indicator and replaces it with an S5 power off state indicator in the sleep type register, thereby enabling the power controller 118 to implement the power off (i.e., shutdown) instead of the sleep state.

Because the contents of the main memory (i.e., state 130 of the computing device 102) has been written to the non-volatile memory 120 prior to implementing the power off state, the computing device 102 may be quickly restarted from the previous state when powering on from the power off state. Thus, according to the disclosed embodiments, the power off state may be implemented in the computing device 102 to conserve power, extend batter life, and comply with regulations on power consumption in the power-off mode, while achieving quicker responsiveness of the computing device 102.

Figure 3:
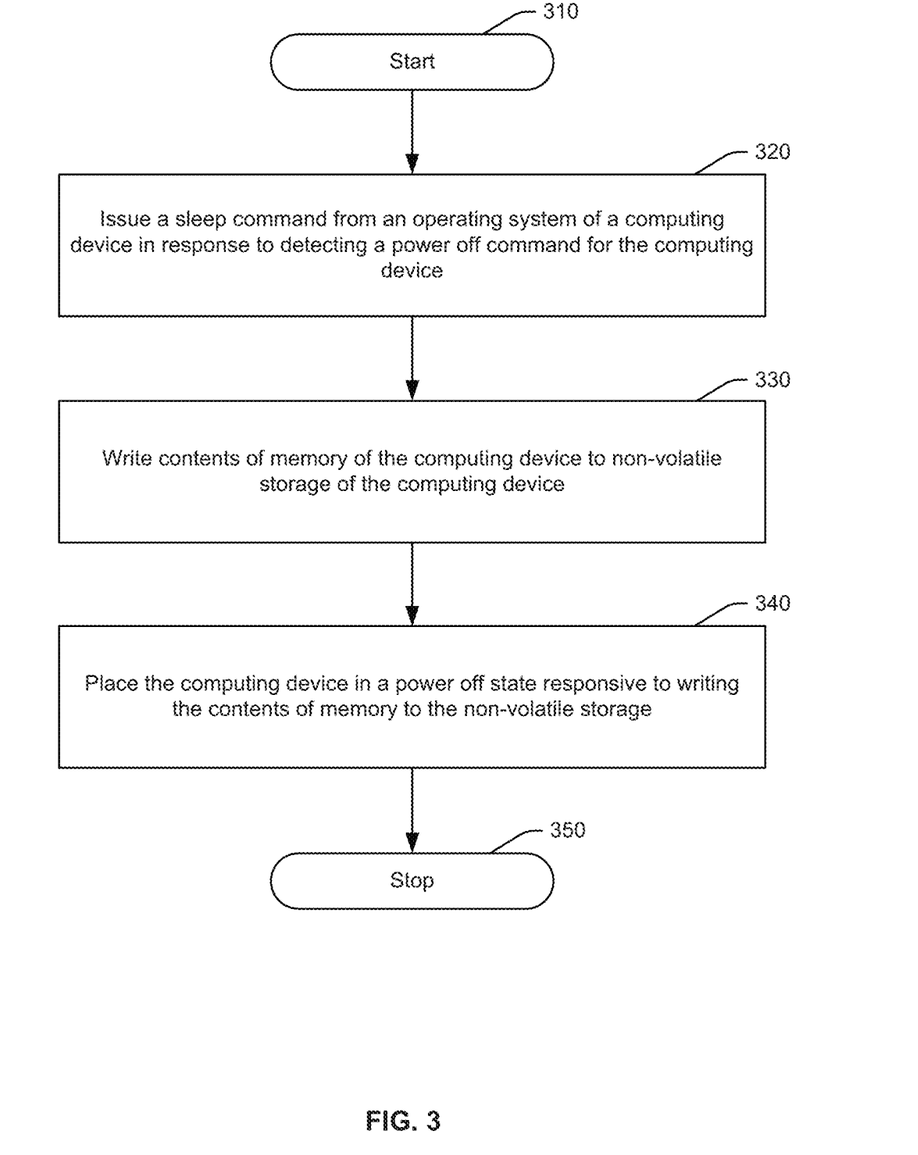
FIG. 3 is a flowchart of an example implementation of a power off state in a computing device.

FIG. 3 is a flowchart of an example method 300 for implementing a power down state in a computing device. Although method 300 is described below with reference to the components of computing device 102, other suitable components for execution of method 300 will be apparent to those of skill in the art. Additionally, the components for executing the method 300 may be spread among multiple devices. Method 300 may be implemented in the form of executable instructions stored on a machine-readable storage medium, such as machine-readable storage medium 510 of FIG. 5, in the form of electronic circuitry, or a combination thereof.

Method 300 may start in block 310 and proceed to block 320, where a sleep command from an operating system of a computing device is issued in response to detecting a power off command for the computing device. The sleep command is to place the computing device in a sleep state. For example, the operating system 112 may issue a sleep command when a power off command is received at the operating system. The power off command may include at least one of a user command to shutdown the computing device, a time out command, and a power off instruction executed by an application. The operating system 112 may issue the sleep command by writing a sleep state indicator to the first register 216. The sleep command may be a S4 state, for example.

Method 300 may proceed to block 330, where content of memory of the computing device is written to non-volatile storage of the computing device. For example, the operating system 112 may write current state 130 of the computing device 102 to non-volatile storage 120 (e.g., hard drive). Current state 130 may include system hardware context, operating system context. The current state 130 may be stored, for example, as a hibernate file in non-volatile storage 120. Thus, upon system wake-up the file is may be written back to main memory 240 from the non-volatile storage 120, thereby preventing latency associated with rebooting the computing device 102 and the operating system 112.

Method 300 may then proceed to block 340, where the computing device is placed in a power off state responsive to writing contents of memory to non-volatile storage. For example, controller 114 may determine that a power off command received at the computing device 102 triggered the sleep command by the operating system 112 (e.g., after saving contents of memory to disk), and proceed to issue the power off command (e.g., by writing the power off state indicator to the sleep-type register 228). Accordingly, the power controller 218 (e.g., the ACPI controller) can execute the power off command Method 300 may then proceed to block 350, where the method 300 stops.

Figure 4:
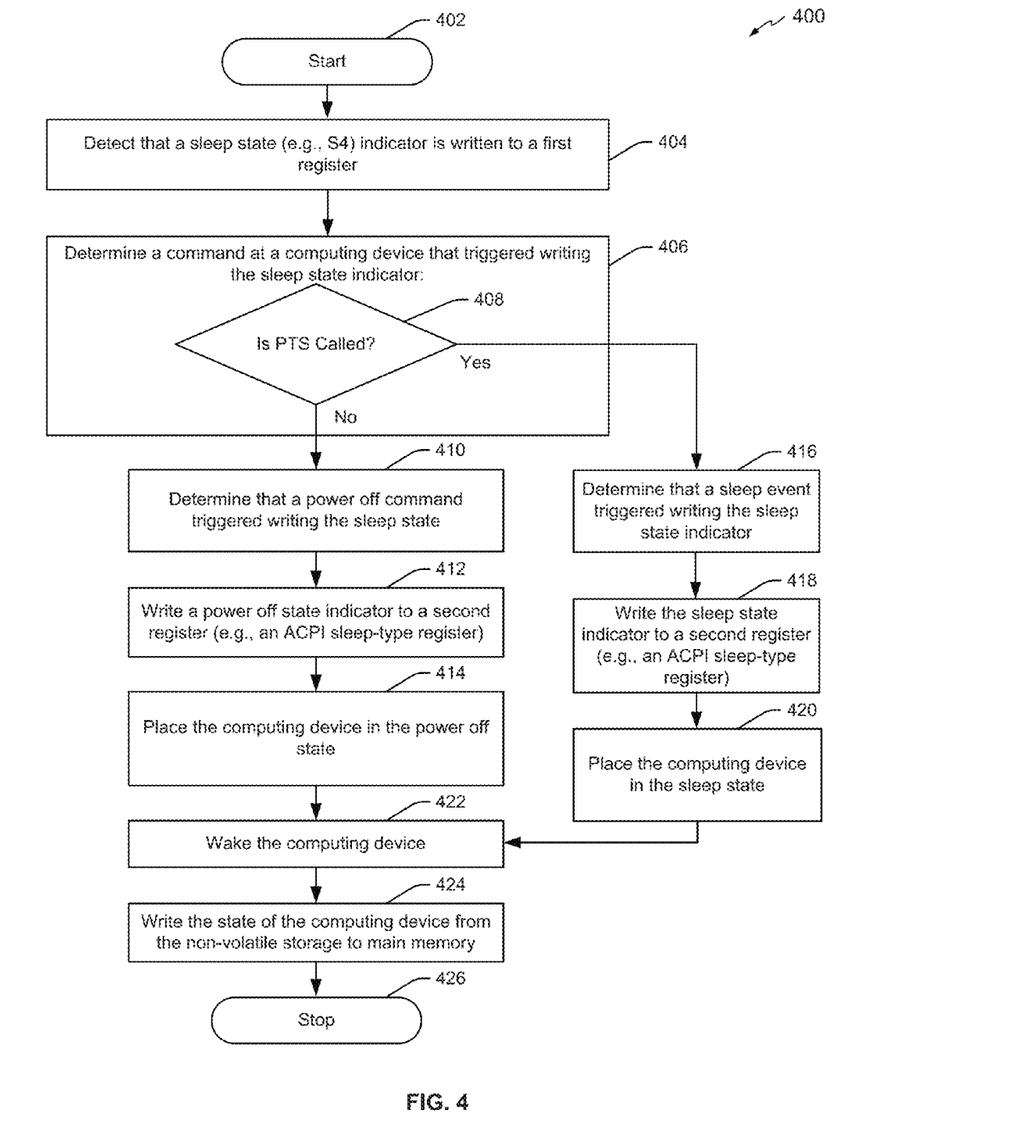
FIG. 4 is a flowchart of another example implementation of a power off state in a computing device.

FIG. 4 is a flowchart of another example method 400 for implementing a power off state in a computing device. Although method 400 is described below with reference to the components of computing device 102, other suitable components for execution of method 400 will be apparent to those of skill in the art. Additionally, the components for executing the method 400 may be spread among multiple devices. Method 400 may be implemented in the form of executable instructions stored on a machine-readable storage medium such as machine-readable storage medium 510 of FIG. 5, in the form of electronic circuitry, or a combination thereof.

Method 400 may start in block 402 and proceed to block 404, where a sleep state indicator is written to a first register is detected. For example, controller 114 may detect that the S4 sleep state indicator is written to the first register 116 by the operating system 112. Alternately, controller 114 may intercept writing of the S4 sleep state indicator into the sleep-type register 228 by the operating system 112.

Method 400 may proceed to block 406, where a command at the computing device that triggered writing the sleep state indicator is determined or identified. Determining the command at the computing device that triggered writing the sleep state indicator may include determining whether PTS method 222 is called, in block 408. For example, controller 114 may determine whether PTS method 222 is invoked by the operating system 112, where the PTS method 222 is indicative of a true S4 sleep event.

If the PTS method is not called, method 400 may proceed to block 410, where it is determined that a power off command triggered writing the sleep state indicator. For example, when the PTS method 22 is not called by the operating system 112 and the S4 state indicator is written to the first register 216, controller 114 determines (e.g., via logic 124) that an S5 command was received at the computing device 102. The S5 command may include a user request to shut down the computing device 102, where such request includes pushing an off button or executing a shut down request via an application. The method 400 may then proceed to block 412, where a power off state indicator is written to a second register. For example, controller 114 may write the S5 state indicator to the sleep-type register 228 (i.e., instead of writing the S4 state indicator). The method 400 may then proceed to block 414, where the computing device is placed in the power off state. For example, the power controller 228 may place the computing device 102 in the S5 state based on the S5 power-type written to the sleep-type register 228.

If, however, the PTS method 222 is called, as determined in block 408, method 400 may proceed to block 416, where it is determined that a sleep command triggered writing the sleep state. For example, when the PTS method 122 is called by the operating system 112, controller 114 determines that a S4 command or a sleep command was received at the computing device 102. The S4 command may include a user request to hibernate the computing device 102 or after the computing device 102 has been idle for a period of time. Method 400 may then proceed to block 418, where a sleep state indicator is written to a second register. For example, controller 114 may write the S4 state to the sleep-type register 228 of the power controller 218. In this case, the controller 114 does not change the sleep-type written by the operating system 112 because a true S4 event occurred. Method 400 may then proceed to block 420, where the computing device is placed in the sleep state. For example, the power controller 218 may place the computing device 102 in the S4 sleep state based on the S4 sleep-type written to the sleep-type register 228.

Method 400 may proceed to block 422, where the computing device is woken up from either the power off state or the sleep state. Method 400 may proceed to block 424, where the state of the computing device is written from non-volatile storage to memory. For example, the controller 114 may determine that content data exists in the non-volatile storage 120 to be written back to memory 240. Thus, because the current state 130 of the computing device 102 was written to non-volatile storage 120 prior to entering the power off state or the sleep state, the state 130 (i.e., hardware context, operating system context, and contents of main memory) may be written back to memory 240. Accordingly, the computing device 102 may resume from the computing device's previous pre-power off or pre-sleep state. Method 400 may then proceed to block 426, where the method 400 stops.

It should be noted that although method 400 describes leveraging the PTS method 222 of the operating system 112 to determine whether a power off event triggered writing the sleep state indicator, other methods may be implemented to determine an event that triggered writing the sleep state indicator. For example, controller 114 may determine a version of the operating system and determine that a particular version of the operating system, by default, writes a sleep state indicator in response to a power off event and in response to a sleep event. Accordingly, the controller 114 can determine when the operating system 112 writes a sleep state indicator responsive to a power off event and when the operating system 112 writes a sleep state indicator responsive to a sleep event.

Figure 5:
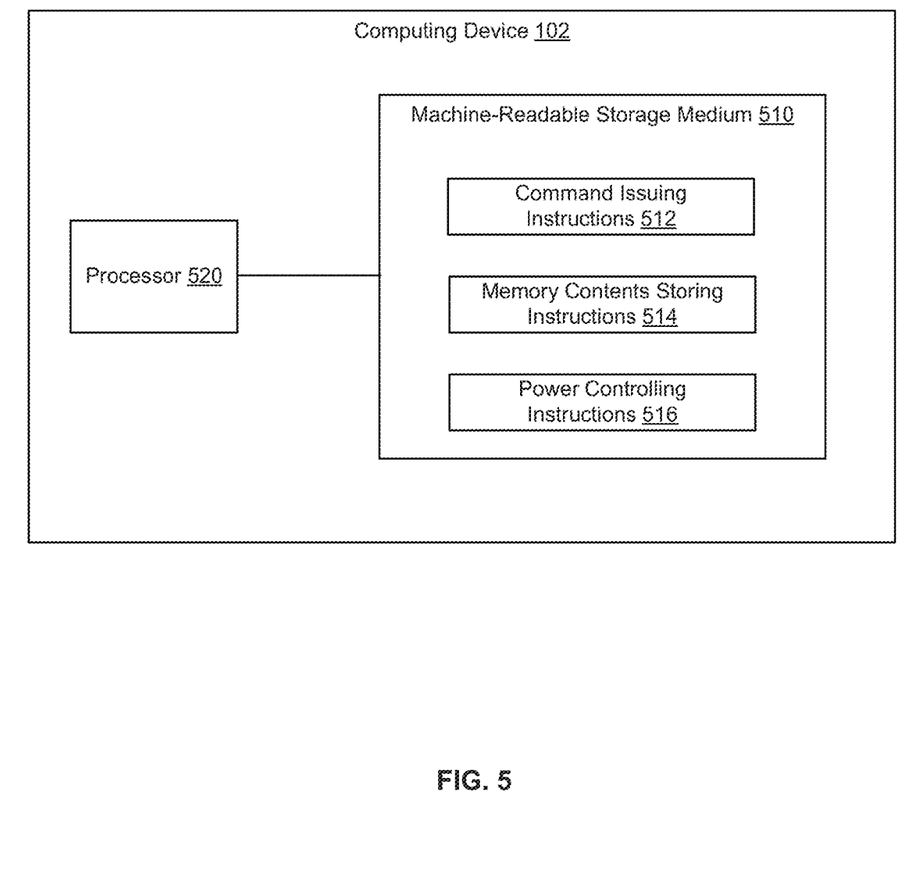
FIG. 5 is a block diagram of example implementation a computing device including a machine-readable storage medium encoded with instructions for implementing a power off state.

FIG. 5 is a block diagram of a computing device including a machine-readable storage medium encoded with instructions for implementing a power down state. In the embodiment of FIG. 5, controller 114 includes processor 520 and machine-readable storage medium 510.

Processor 520 may be a microprocessor, a semiconductor-based microprocessor, other hardware devices or processing elements suitable for retrieval and execution of instructions stored in machine-readable storage medium 510, or any combination thereof. Processor 520 may fetch, decode, and execute instructions stored in machine-readable storage medium 510 to implement the functionality described in detail below. As an alternative or in addition to retrieving and executing instructions, processor 510 may include at least one integrated circuit (IC), other control logic, other electronic circuits, or any combination thereof that include a number of electronic components for performing the functionality of instructions 512, 514, and 516 stored in machine-readable storage medium 510. Further, processor 520 may include single or multiple cores on a chip, include multiple cores across multiple devices, or any combination thereof.

Machine-readable storage medium 510 may be any non-transitory electronic, magnetic, optical, or other physical storage device that contains or stores executable instructions. Thus, machine-readable storage medium 510 may be, for example, NVRAM, Random Access Memory (RAM), an Electrically Erasable Programmable Read-Only Memory (EEPROM), a storage drive, a Compact Disc Read Only Memory (CD-ROM), and the like. Further, machine-readable storage medium 510 can be computer-readable as well as non-transitory. As described in detail below, machine-readable storage medium 510 may be encoded with a series of executable instructions for implementing a power down state in the computing device 102. The executable instructions may be, for example, a portion of an operating system of computing device 102 or a separate application running on top of the OS to implement the power down state. Other suitable formats of the executable instructions will be apparent to those of skill in the art.

Machine-readable storage medium 510 may include command issuing instructions 512, which may be configured to issue a sleep command to place the computing device in a sleep state in response to detecting a power off command for the computing device. For example, command issuing instructions 512 may be configured to issue a sleep state command to place the computing device 102 in the sleep state responsive to detecting a power off command at the computing device 102. The power off command may include a user request to shutdown the computing device 102, for example.

Machine-readable storage medium 510 may include memory contents storing instructions 514, which may be configured to store contents of memory of the computing device to non-volatile storage of the computing device. For example, memory contents storing instructions 514 may be configured to store contents of memory 240 to non-volatile storage 120. The contents of memory 240 may include current state 130 of the computing device, operating system context, and hardware context. Further, contents storing instructions 514 may be configured to write back the stored current state 130 from the non-volatile storage 120 to the memory 240 during wake-up.

Machine-readable storage medium 510 may also include power controlling instructions 516, which may be configured to place the computing device in a power off state responsive to writing the contents of memory to the non-volatile storage. For example, power controlling instructions 516 may place the computing device in the power off state in response to writing the contents 130 of memory 240 to non-volatile memory 120. Further, power controlling instructions 516 may be configured to implement power savings where power to nonessential hardware is turned off such that less than 1 W (e.g., 0.5 W) of power is consumed by the computing device 102. During the S5 maximum power savings, wake events and management services of the computing device 102 are turned off.

According to the embodiments described in details above, power consumption of a computing device may be reduced to approximately 0.5 W in a power off mode while achieving a sleep mode responsiveness of the computing device during wake up.

What is claimed is:

1. A computing device comprising:
an operating system configured to:
issue a sleep command to place the computing device in a sleep state in response to the computing device receiving a power off command;
write contents of memory of the computing device to non-volatile storage of the computing device; and
invoke a prepare-to sleep (PTS) method in response to the issuance of the sleep command; and
a controller to:
reference the PTS method to determine if a power off command received at the computing device triggered the sleep command; and
issue the power off command to place the computing device in a power off state in response to determining that the power off command triggered the sleep command.

2. The computing device of claim 1, further comprising a power controller to execute the power off command.

3. The computing device of claim 2, wherein the power controller implements advanced configuration and power interface (ACPI).

4. The computing device of claim 1, wherein the power off command comprises at least one of a user command to shutdown the computing device, a time out command, and a power off instruction executed by an application.

5. The computing device of claim 1, wherein the sleep state is an ACPI S4 sleep state and the power off state is an ACPI S5 power state.

6. The computing device of claim 1, wherein the operating system is further configured to:
write a sleep state indicator to a first register; and
invoke the PTS method in response to the computing device receiving a sleep command from the operating system,
wherein the operating system does not invoke the PTS method in response to the computing device receiving the power off command.

7. The computing device of claim 6, the controller comprising logic to determine whether the PTS method is invoked by the operating system, wherein the controller is to write a power off state indicator to a second register when the PTS method is not invoked.

8. The computing device of claim 7, wherein the second register is an ACPI sleep-type register indicating an ACPI sleep-type to be implemented.

9. The computing device of claim 1, wherein the controller is further to implement an S5 maximum power savings, and wherein wake events and management services of the computing device are disabled.

10. A method comprising:
issuing a sleep command from an operating system of a computing device in response to detecting a power off command for the computing device;

writing contents of a memory of the computing device to a non-volatile storage of the computing device;

invoking a prepare-to sleep (PTS) method in response to the issuance of the sleep command;

referencing the PTS method to determine if the power off command received at the computing device triggered the sleep command; and placing the computing device in a power off state responsive to determining that the power off command triggered the sleep command and writing the contents of the memory to the non-volatile storage.

11. The method of claim 10, wherein the sleep state is an advanced configuration and power interface (ACPI) S4 sleep state and wherein the power off state is an ACPI S5 power state.

12. The method of claim 10, wherein determining that the power off command triggered the sleep command comprises:

determining whether the operating system invokes the prepare-to-sleep (PTS) method; and when the operating system does not invoke the PTS method, writing a power off state indicator to a sleep-type register.

13. The method of claim 12, wherein when the operating system invokes the PTS method:

determining that a sleep command for the computing device triggered the sleep command by the operating system;

writing a sleep state indicator to the sleep-type register, and placing the computing device in the sleep state.

14. The method of claim 12, wherein the sleep-type register is an ACPI sleep-type register of a power controller that indicates a power state to be executed by the power controller.

15. The method of claim 10, further comprising implementing an S5 maximum power savings, wherein wake events and management services of the computing device are disabled during the S5 maximum power savings.

16. The method of claim 10, further comprising:

waking the computing device from the power off state; and writing contents of the non-volatile storage to memory responsive to determining that the non-volatile memory contains data.

17. The method of claim 16, wherein determining that non-volatile memory contains data comprises determining if the operating system is configured to store contents of memory to the non-volatile storage prior to implementing an ACPI power state.

18. A non-transitory computer readable medium comprising instructions that, when executed by a processor of a computing device, cause the processor to:

issue a sleep command to place the computing device in a sleep state in response to detecting a power off command for the computing device;

write contents of memory of the computing device to non-volatile storage of the computing device;

invoke a prepare-to sleep (PTS) method in response to the issuance of the sleep command;

reference the PTS method to determine if a power off command received at the computing device triggered the sleep command; and place the computing device in a power off state responsive to writing the contents of memory to the non-volatile storage.

19. The non-transitory computer readable medium of claim 18, further comprising instructions executable by the processor to execute an advanced configuration and power interface (ACPI) S5 maximum power savings process, wherein the computing device is powered down to approximately 0.5 W power consumption, and wherein wake events and management services of the computing device are disabled during the maximum S5 power savings.

* * * * *